May 26, 1970     P. R. STAPLES     3,514,733
SNAP-ACTION HOT WIRE POWER SWITCHING RELAY
Filed June 14, 1968     2 Sheets-Sheet 1
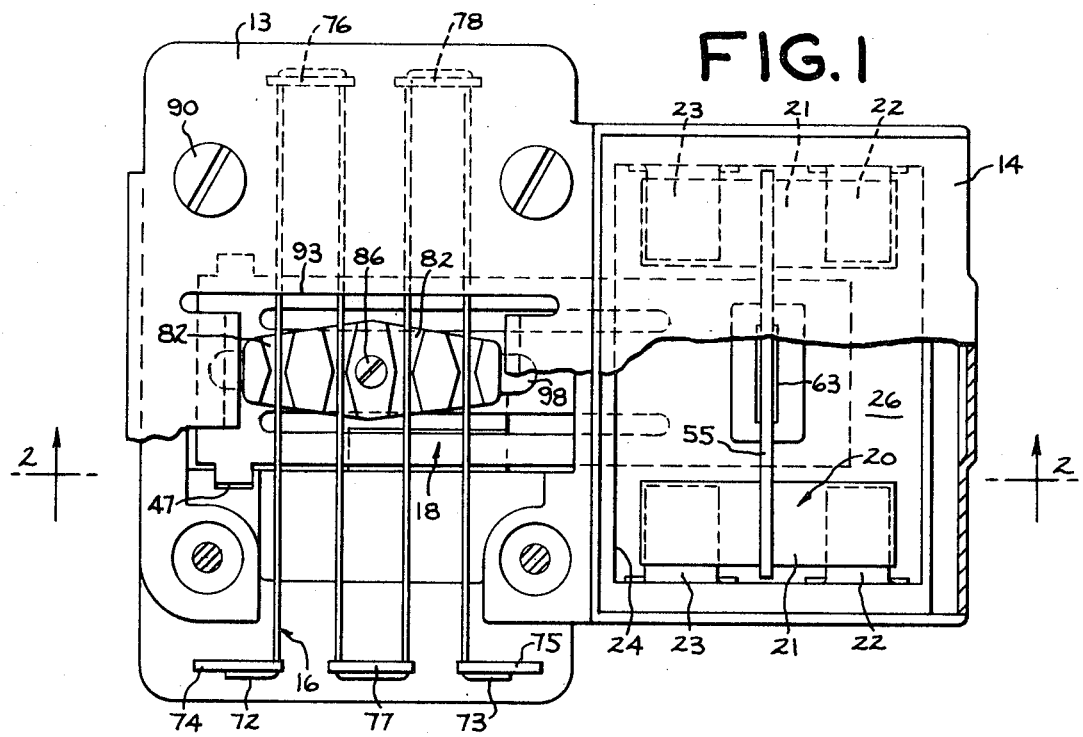
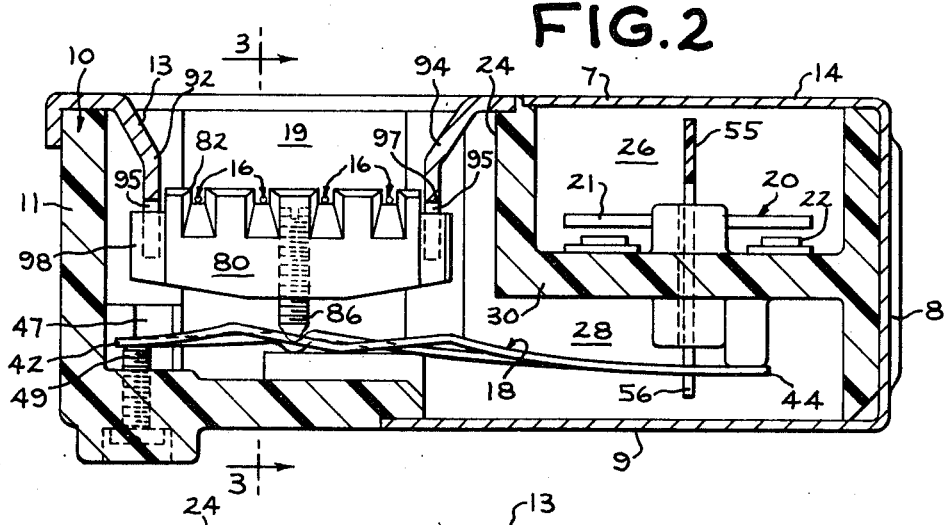
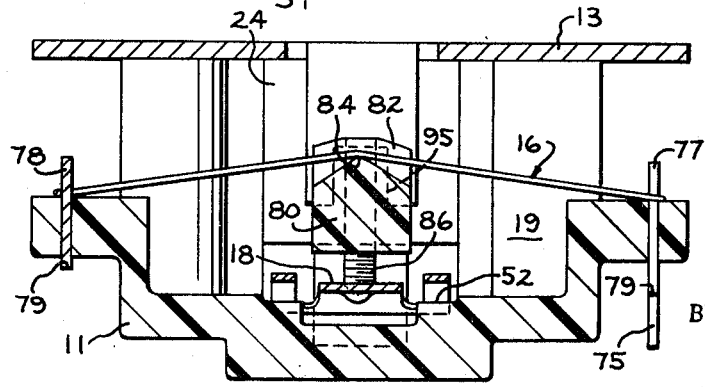
INVENTOR.
PAUL R. STAPLES
BY Richard L. Caslin
HIS ATTORNEY

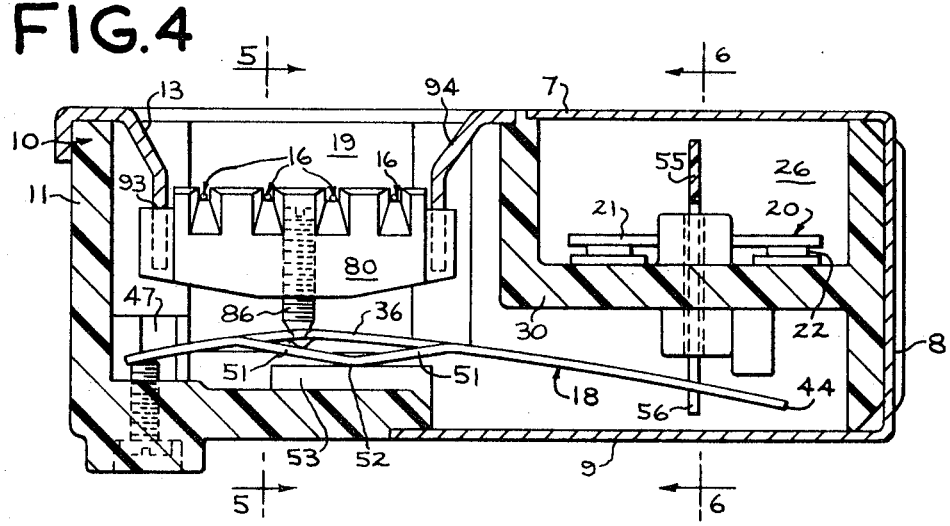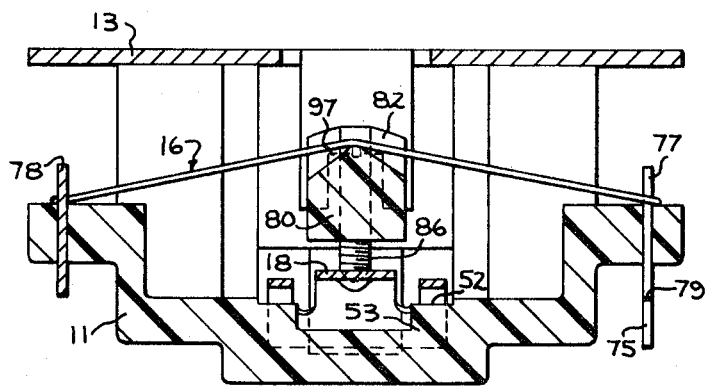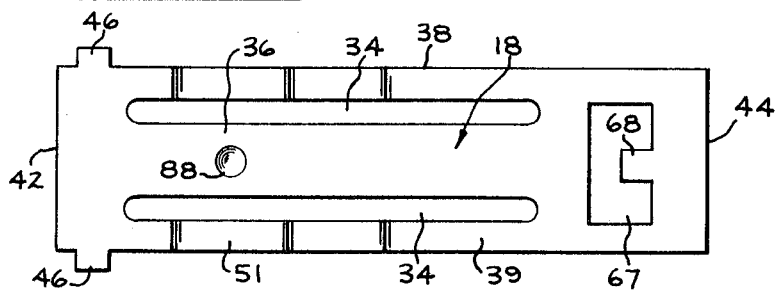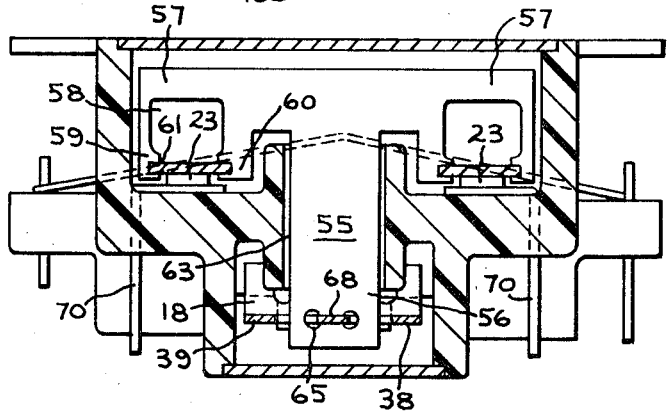

United States Patent Office 3,514,733
Patented May 26, 1970

3,514,733
SNAP-ACTION HOT WIRE POWER SWITCHING RELAY
Paul R. Staples, Louisville, Ky., assignor to General Electric Company, a corporation of New York
Filed June 14, 1968, Ser. No. 737,139
Int. Cl. H01h *61/06, 71/18*
U.S. Cl. 337—133                                7 Claims

ABSTRACT OF THE DISCLOSURE

A hot wire, power switching relay having a hollow housing formed by an insulating base and several metal cover plates which substantially close the base, especially the part of the base surrounding the power switch thereof. The base supports four main elements; a hot wire of sinuous shape with multiple strands suspended from opposite sides of the base, a snap-acting spring mechanism having one end underlying the hot wire, and a power switch with fixed and movable contacts. The fourth element is an adjustable actuator interposed between the hot wire and the one end of the spring mechanism so that the tension of the strands of the hot wire may be equalized and transferred to the spring mechanism as a compressive force. The spring mechanism has an opposite end that is connected to the movable contacts of the power switch for the sudden operation thereof. Hence, when the hot wire is electrically energized it becomes heated and it stretches. This reduces the tensile stress on the hot wire which in turn reduces the force of the actuator bearing on the spring mechanism and permits the spring mechanism to perform a snap-action which in turn operates the movable contacts of the power switch. One of the cover plates which overlie the hot wire has guide means in engagement with the actuator. These guide means include motion limit means for the actuator so as to relieve the tensile stress of the hot wire during its energization. The hot wire relay is calibrated by first applying a small voltage to the hot wire. This stretches the wire. The adjusting screw of the actuator is turned until the actuator engages the motion limit means of the guide means of the cover plate. Then the same screw is reversed between one and two turns to select a neutral or central position for the armature.

CROSS-REFERENCE TO RELATED PATENTS

The present invention is an important modification of the hydraulic thermostat with snap-acting switch mechanism that is taught by the present applicant in my Pat. No. 3,293,394, which is also assigned to the General Electric Company, the assignee of the present invention. This invention retains the snap-acting switch mechanism of the above-mentioned Staples patent, while it incorporates a novel hot wire, adjustable actuator and mounting arrangement in place of the manually adjustable hydraulic bellows of the patent.

BACKGROUND OF THE INVENTION

Most major electrical appliances require a large amount of electrical power in performing their required functions. The necessary electrical power switching means cannot be performed by the low voltage temperature sensing or condition responsive means; hence, it is necessary to provide the appropriate power gain device to control the electrical load power. Present power switching practice utilizes magnetic or thermal power switching relays, and both of these systems have many advantages and a few disadvantages. The present invention of a snap-acting hot wire, power switching relay combines many of the advantages of the prior thermal and magnetic power switching relays while minimizing their disadvantages.

The principal object of the present invention is to provide a hot wire power switching relay wherein the tensile stress of the hot wire is relieved during relay energization so as to prevent wire creep during tensile loading of the wire when the wire is heated.

A further object of the present invention is to provide a hot wire, power switching relay which utilizes the linear expansion of an electrically heated wire to provide relatively small motion while exerting a relatively large force.

A further object of the present invention is to provide a hot wire, power switching relay of the class described with motion limit means for relieving the tensile stress in the heated wire during the relay energization so as to prevent wire creep during tensile loading in the wire when the wire is heated.

A still further object of the present invention is to provide a hot wire relay of the class described with a precise method of relay calibration which provides equal load sharing between the individual wire strands, as well as establishes the proper working angle between the wire and the actuator and also the total travel of the wire-supporting actuator.

SUMMARY OF THE INVENTION

The present invention, in accordance with one form thereof, relates to a hot wire power switching relay having a hollow housing supporting a hot wire of sinuous shape, a snap-acting spring mechanism and a power switch with fixed and movable contacts. Interposed between the hot wire and the spring mechanism is a calibrated actuator which exerts a force created by the hot wire on the spring mechanism. One end of the spring mechanism is joined to the movable contacts so that the snap action of the spring mechanism causes operation of the movable contacts of the power switch. The invention includes a motion limit means for the actuator so the actuator is rendered immobile by the motion limit means, so as to limit the tensile stress on the hot wire during its energization after a predetermined amount of travel.

BRIEF DESCRIPTION OF THE DRAWINGS

FIG. 1 is a top plan view of the hot wire, power switching relay of the present invention with the two covers broken away along the lower portion of the view to show a hot wire with multiple strands of sinuous shape at the left side of the device and a power switch arranged at the right side.

FIG. 2 is a longitudinal, cross-sectional elevational view taken on the line 2—2 of FIG. 1 and showing the four main elements of the relay within the hollow housing thereof; namely, the hot wire in its unenergized mode, a calibrated actuator beneath the hot wire, a snap-acting spring mechanism acted upon by the actuator and a normally open power switch having fixed and movable contacts where the movable contacts are connected to one end of the spring mechanism and operated thereby.

FIG. 3 is a transverse cross-sectional elevational view taken on the line 3—3 of FIG. 2 and showing the manner of supporting the hot wire and its relationship with the actuator and in turn the cooperation of the actuator with the snap-acting spring mechanism.

FIG. 4 is a longitudinal cross-sectional elevational view similar to that of FIG. 2 except that the hot wire has been energized and the spring mechanism has snapped to its opposite position to close the power switch.

FIG. 5 is a transverse cross-sectional elevational view similar to that of FIG. 3 but taken on the line 5—5 of FIG. 4 when the hot wire has been energized.

FIG. 6 is a transverse cross-sectional elevational view taken on the line 6—6 of FIG. 4 in the area of the power switch and showing the nature of such switch and how the movable contacts are joined to one end of the spring mechanism.

FIG. 7 is a top plan view of the snap-acting spring mechanism which may be defined as a combined blade and amplitude spring.

Referring in detail to the drawings, and in particular to FIG. 2, 10 represents the hollow housing of the hot wire, power switching relay of the present invention formed by an insulating box-like base 11 and a pair of metal cover plates 13 and 14 for substantially closing the base and completing the housing. This hot wire relay comprises three main elements in addition to the housing 10; namely, a hot wire 16 of sinuous shape with multiple strands or loops as is best seen in the top plan view of FIG. 1, and a snap-acting spring mechanism 18 as is best seen in both the side view of FIG. 2 and in the top plan view of FIG. 7, and a power switch 20 which is a double-pole switch having two movable contacts 21 and two pairs of fixed contacts 22 and 23.

The recessed base 11 is a box-like member of molded plastic formed of a phenolic resin or the like insulating material, while the two cover plates 13 and 14 are sheet metal stampings. The shape of the base 11 is generally rectangular in plan view and it is divided into two substantially equal sections by a central transverse partition 24. The first section at the right side of the partition 24 in FIG. 1 is adapted to receive the power switch 20, while the second section 19 at the left side of the partition 24 serves to accommodate the hot wire 16. Moreover, the first section is divided into an upper switch compartment 26 and a lower compartment 28 by the presence of a horizontal partition 30 therebetween.

Notice that the transverse vertical partition 24 does not extend to the bottom wall of the base 11 but terminates at the edge of the horizontal partition 30 so that the lower compartment 28 communicates with or is open to the lower portion of the compartment 19 for the hot wire 16. Located within the bottom portion of the base is the snap-acting spring mechanism 18 which extends for nearly the complete length of the base. This spring mechanism 18 is in the form of a combined blade and amplitude spring as is best seen in FIG. 7. It is of generally elongated rectangular configuration in plan view, and it is made of thin sheet, spring stock such as beryllium copper or the like. This blade is provided with a pair of longitudinal parallel slots 34, 34 which stop short of the ends of the blade so as to define three longitudinal strips; namely, a center strip 36 and two identical side strips 38 and 39. By studying FIG. 4 when the hot wire 16 is energized and little or no force is exerted on the spring blade 18, the more or less natural or unstressed configuration of the blade can be visualized as a bowed shape that is convex upwardly.

The left end 42 of the blade may be considered the supported end, while the right end 44 may be considered as the free or bistable end of the blade. The blade must be restrained from moving in a horizontal plane and this is accomplished by interlocking the supported end 42 of the blade with the base 11. Looking at FIGS. 1 and 7, the supported end 42 of the blade is provided with a pair of oppositely directed ears 46 which are each adapted to fit snugly into a vertical slot 47 formed in the bottom portion of the base, as is seen in both FIGS. 1 and 2. Thus, in order to install the spring blade 18 in the base 11, the free end 44 of the blade is first inserted into the hot wire compartment 19 and beneath the partition 24 and into the lower compartment 28 until the ears 46 of the spring blade 18 are in a position to drop into the opposing vertical slots 47 of the base.

The spring blade 18 is supported at three points. One point is for calibration purposes and is represented by a vertical differential adjusting screw 49 which extends up through a threaded opening in the bottom wall of the base 11 adjacent the supported end 42 of the blade as is best seen in FIG. 2. This screw 49 intersects an imaginary line interconnecting the two supporting ears 46 of the blade. The two remaining support points for the spring blade 18 are created by the two side strips 38 and 39 thereof where portions are folded downwardly to form a V-section 51 in each, as is best seen in FIG. 4, so that knife edges 52 are located in an imaginary transverse line with each other and are adapted to bear upon support blocks 53 on the bottom wall of the base 11.

Now it is necessary to connect the free end 44 of the spring blade 18 with the power switch 20. The power switch is a single-throw double-pole mechanism having two pairs of fixed contacts 22, 23 and a pair of movable contacts 21. The movable contacts are operated in unison by an insulating carrier member 55 which is best seen in FIG. 6 as a generally T-shaped member having a vertical shank 56 and overhanging side arms 57. Each side arm 57 is provided with a cut-out portion 58 which creates two opposed resilient fingers 59 and 60 with a slotted portion 61 in each to receive the side edge of the movable contact 21 at the midportion thereof. As is best seen in the top plan view of FIG. 1, the horizontal partition 30 has a centrally located vertical slot 63 for receiving the shank 56 of the carrier member 55 therethrough, so that a connection may be made between the free end of the spring blade 18 and the movable contacts 21, 21 through the medium of the insulating carrier 55.

The connection between the shank 56 of the carrier 55 and the free end 44 of the spring blade 18 is made by punching a small slot 65 in the bottom portion of the shank 56 of the carrier, and forming a generally C-shaped slot 67 adjacent the free end 44 of the spring blade 18 so that an inwardly directed finger or locking member 68 is created for insertion into the slot 65 of the shank 56, as is clear from FIG. 6.

Continuing to study the transverse cross-sectional elevational view of FIG. 6, it will be noted that the fixed contacts 23 are formed with perpendicular terminal tabs 70 which extend out through the bottom wall of the base 11 and are exposed to permit the making of an electrical connection therewith, as will be well understood by those skilled in this art.

It is well to substantially close the power switch compartment 26 of the base to prevent dirt and moisture from accumulating on the electrical contacts and perhaps causing faulty operation. This is accomplished by the cover plate 14 which slides over the open top of the switch compartment. Actually, the lower compartment 28 beneath the switch compartment 26 is also open by virtue of the fact that the bottom wall of the base is cut away in this area. Hence, the cover plate 14 is a generally U-shaped member in side view which snaps into place, as is seen in FIG. 2, with a top, horizontal portion 7, a vertical portion 8 extending over the side from top to bottom of the base, and a bottom, horizontal portion 9 closing the lower compartment 28.

Now for a description of the hot wire 16 and its related structure, attention is first directed to FIG. 1. The hot wire 16 is a single elongated strand of sinuous shape, and it is connected at each end 72 and 73 to electrical terminals 74 and 75 respectively which are located on the same side wall of the base 11. The intermediate portion of the hot wire is strung across the base from one side wall to the other and wound around three post members 76, 77 and 78 in that order until the wire terminates at its opposite terminals 74 and 75. These post members 76, 77 and 78 are actually quite similar in construction to the electrical terminals 74 and 75 except that they are not for making an electrical termination. Hence, this is the reason that the bottom portion of each post member is cut off as at 79 in FIG. 3. While the hot wire is shown as being of sinuous shape with four passes, it will be understood by those skilled in this art that in some circumstances the wire could have as few as two passes and perhaps more than four.

Some slack is left in the hot wire 16, and an insulating actuator 80 is positioned centrally under the expanse of the wire, as it best seen in FIG. 1 and, is sandwiched between the hot wire 16 and the spring blade 18. The top edge of the actuator 80 is provided with a series of four transverse grooves 82 which are each designed to receive one strand or pass the wire 16 as the strand extends from one side wall to the opposite side wall of the base 11. Each groove 82, when viewed from the top, is rather narrow in the center and diverges outwardly toward each end of the groove in the general shape of an hour glass so that the actuator 80 may move slightly about a vertical axis without the side walls of the groove making contact with the wire strand so as to avoid creating a binding action. Moreover, the bottom of each groove 82 is provided with a central knife edge 84, as is best seen in the transverse view of FIG. 3, so that there is almost a point contact between each strand of the wire 16 and the actuator 80 at the bottom of each groove 82. The actuator 80 incorporates a vertically adjustable screw 86 adjacent the center thereof, which is accessible from the top, and seats at its lower end in a dimple 88 formed in the center strip 36 of the spring blade 18. This adjusting screw 86 has a pointed tip for insertion into the dimple 88 so as to give substantially a point contact therebetween. It is important to provide equal load sharing between the individual wire strands as well as establishing the proper working angle of the wire and the total travel of the wire-supporting actuator 80. Thus, the adjusting screw is positioned to create the conditions of FIG. 2 when the hot wire is de-energized.

The metal cover 13 is adapted to substantially overlie the hot wire compartment 19. Fastening screws 90 adjacent the four corners thereof are adapted to be threaded into tapped openings in the top wall of the base member. This cover 13 is provided with means for guiding or confining the actuator 80 as well as to serve as a motion limit means. For example, two downwardly lanced tabs 92 and 94 are formed in the central portion of the cover thereby creating a generally rectangular window 93 in the center of the cover. The lower portion of each lancing 92 and 94 is formed with an elongated bifurcation 95 which is adapted to slip over the adjacent side or end 98 of the actuator 80 so that the movement of the actuator 80 is limited to vertical movement depending upon the elongation of the strands of wire 16 as the wire is electrically energized and heated thereby. The top portion of the bifurcation 95 serves as a stop 97 which comes into action once the hot wire is energized and elongated, thereby allowing the compressive force of the spring blade 18 to overcome and raise the actuator 80 until the ends 98 of the actuator seat upon the stops 97 of the cover plate 13. Then upon further elongation of the wire strand, the wire is relieved of tensile stress from the actuator as the actuator movement ends, thereby preventing wire creep due to tensile loading in the wire when the wire is heated.

The invention of this hot wire relay is connected with relieving the tensile stress in the heated wire during relay energization. This prevents wire creep due to tensile loading in the wire when the wire is heated. The method of calibration that is used not only accomplishes this objective, but provides equal load sharing between the individual wire strands as well as establishes the proper working angle of the wire with respect to the actuator, and the total travel of the wire-supporting actuator.

The hot wire relay is calibrated by applying about four volts full wave AC to the wire terminals 74 and 75. Then the four strands of wire are stretched equally by adjusting the screw 86 in the actuator 80 until the actuator is raised until its ends 98, 98 engage the stops 97, 97 of the bifurcation 95 of the cover 13. There should be a torque limit on the screw 86 of between 12–16 inch-ounces. Then back off the screw 86 between one and two complete turns. Differential adjusting screw 49 in the bottom of the base is also manipulated with the hot wire 16 energized at alternate voltage levels between 5 and 6 volts, and an electrical load connected across the power switch contacts 21, 22, 23. The screw 86 is turned until the switch contacts 21, 22 and 23 close, and the differential adjusting screw is turned until these same contacts open.

Modifications of this design will occur to those skilled in this art. Therefore, it is to be understood that this invention is not limited to the particular embodiments disclosed but that it is intended to cover all modifications which are within the true spirit and scope of this invention as claimed.

What I claim as new and desire to secure by Letters Patent of the United States is:

1. A relay mechanism comprising a housing enclosing an elongated conducting wire of sinuous shape, a snap-acting spring mechanism and an electrical switch means, said conducting wire having a high coefficient of thermal expansion and adapted to move a preselected amount in response to a preselected change of the electrical energization thereof, an actuator disposed between the conducting wire and the spring mechanism so that movement of the wire is reflected as a varying force exerted upon the spring mechanism, said switch means having a fixed contact means and a movable contact means, said spring mechanism including a portion for engaging the movable contact means and serving to open and close an electrical circuit through said contact means, the housing including guide means cooperating with the actuator for facilitating the movement of said actuator upon expansion of said conducting wire, said conducting wire expanding when it is energized and becomes heated thereby decreasing the force holding the actuator against the spring member, and said guide means including a motion limit means for the actuator whereby the energization of the conducting wire causes it to expand and thereby reduce its force exerted through the actuator against the spring mechanism thereby allowing the actuator to shift and engage the motion limit means to relieve the tensile stress on the wire during its energization.

2. A hot wire relay mechanism comprising a housing formed by a base member and a removable cover means, said base member having assembled therein a snap-action switch mechanism that is adapted to be connected to a power circuit, said mechanism including an elongated spring blade and fixed and movable switch contact means, said spring blade being joined to the movable contact means for opening and closing the switch contact means, and a conducting wire of serpentine shape supported across the base and transversely above a portion of the end of the spring blade that is remote from the movable contact means, said wire being adapted to be connected in an input signalling circuit, an actuator underlining the serpentine wire and supported on the spring blade, said actuator including an adjustment screw for varying the height of the actuator and hence the force exerted between the spring blade and the serpentine wire, the cover means including bifurcated members which slip over the two ends of the actuator and provide a guiding and motion limiting means, whereby when the conducting wire is energized it expands to reduce the force exerted by the actuator against the spring blade causing the actuator to shift and engage the motion limiting means of the cover means which relieves the tensile stress on the wire during its energizaion.

3. A hot wire relay mechanism comprising a housing formed by an insulating base member and removable cover means, said base member having power switch means with fixed and movable switch contacts, a snap-acting spring blade supported within the base and connected at one end to the movable switch contacts, a conducting wire looped into a serpentine shape around a plurality of posts at opposite sides of the base to overlie the end of the spring blade that is remote from the end connected to the movable switch contacts, said wire being adapted to be connected in an input signal circuit, an insulating bridge member positioned beneath the various reaches of the wire adjacent the mid-span thereof, the upper edge of the bridge member being slotted to receive each reach of the wire and space them apart, an adjustment screw in the center of the bridge member extending out the bottom thereof and pressed against the spring blade, the adjustment screw being accessible from the top for changing its adjustment, the housing including motion limit means for the bridge member whereby when the conducting wire is energized it is elongated which allows the force of the spring blade to overcome the force of the conducting wire which moves the bridge member against the motion limit means thereby relieving the tensile stress on the conducting wire during its energization.

4. A hot wire relay mechanism as recited in claim 3 wherein the snap-acting spring blade has three longitudinal strips that are joined together at their ends, the blade being bowed upwardly to place the center strip in engagement with the adjusting screw, each of the side strips being formed with a depression to provide a pair of transversely aligned bearing surfaces engaging a bottom wall of the base member, a differential adjusting screw extending through the bottom wall of the base member and into engagement with the underside of the end of the blade that is remote from the movable switch contacts to serve as a fulcrum, the base member including means for restraining the blade from sliding off of said fulcrum.

5. A hot wire, power switching relay comprising a hollow housing formed by an insulating base and removable cover means, said base supporting a power switch having fixed and movable contacts, a combined blade and amplitude spring connected at one end to the movable switch contacts, said spring blade being slotted to form three longitudinal strips that are joined together at their ends, the spring blade being formed convex upwardly, each of the side strips being formed with a downward depression to provide a pair of transversely aligned rocker bearing surfaces engaging a bottom wall of the base, the end of the spring blade that is remote from the power switch being attached to the base, and a hot wire of sinuous form suspended across the base adjacent the said attached end of the spring blades, an actuator interposed between the center strip of the spring blade and each of the turns of the hot wire, said actuator being adjustable in height to apply tension to the hot wire and place the spring blade under compression so that under normal conditions the power switch is open, said hot wire being adapted to be connected in an input signal circuit so that when it is energized the wire becomes elongated which decreases the force of the wire on the actuator and hence on the spring blade thereby allowing the blade to flex and close the power switch.

6. A hot wire, power switching relay as recited in claim 5 wherein the housing includes motion limit means for the actuator whereby when the hot wire is energized the actuator shifts into engagement with the said motion limit means thereby relieving the tensile stress on the hot wire while it is energized.

7. A hot wire, power switch relay comprising a hollow housing formed by an insulating base and removable cover means, said base supporting a power switch having fixed and movable contacts, a snap-acting spring mechanism cooperating with the said movable contacts, and a hot wire of sinuous shape suspended across the base and overlying a portion of the spring mechanism which is remote from the said power switch, an actuator interposed between the hot wire and the spring mechanism, said actuator supporting an adjusting screw means for varying the force exerted by the wire on the spring mechanism, the said removable cover having guide means for receiving the opposite ends of the actuator, the said cover means including motion limit means for the actuator whereby the energization of the hot wire causes it to expand and thereby reduce its force exerted through the actuator against the spring mechanism thereby allowing the actautor to shift and engage the motion limit means to relieve the tensile stress on the wire during is energization.

References Cited
UNITED STATES PATENTS

| | | | |
|---|---|---|---|
| 3,176,099 | 3/1965 | Bergsma | 337—140 XR |
| 2,354,933 | 8/1944 | Winborne | 337—126 |
| 2,340,877 | 2/1944 | Hausler | 337—133 |

BERNARD A. GILHEANY, Primary Examiner

D. M. MORGAN, Assistant Examiner

U.S. Cl. X.R.

337—135, 140